(12) United States Patent
Wallner

(10) Patent No.: US 8,896,163 B2
(45) Date of Patent: Nov. 25, 2014

(54) ELECTRIC MICROMOTOR

(75) Inventor: Herbert Wallner, Schönaich (DE)

(73) Assignee: Dr. Fritz Faulhaber GmbH & Co. KG, Schonaich (DE)

( * ) Notice: Subject to any disclaimer, the term of this patent is extended or adjusted under 35 U.S.C. 154(b) by 195 days.

(21) Appl. No.: 13/365,585

(22) Filed: Feb. 3, 2012

(65) Prior Publication Data
US 2012/0200203 A1    Aug. 9, 2012

(30) Foreign Application Priority Data

Feb. 4, 2011    (DE) .......................... 20 2011 002 402

(51) Int. Cl.
*H02K 11/00* (2006.01)
*H02K 37/00* (2006.01)
*H02K 29/08* (2006.01)

(52) U.S. Cl.
CPC ..................................... *H02K 29/08* (2013.01)
USPC .................... 310/40 MM; 310/46; 310/68 B; 310/68 R

(58) Field of Classification Search
CPC ............................... H02K 11/00; G01D 5/245
USPC ........ 310/40 MM, 46, 68 B, 68 R; 324/207.2
See application file for complete search history.

(56) References Cited

U.S. PATENT DOCUMENTS

| | | | |
|---|---|---|---|
| 4,283,679 A | | 8/1981 | Ito et al. |
| 4,755,699 A | * | 7/1988 | Schmider .................... 310/68 R |
| 6,107,704 A | * | 8/2000 | Wallner et al. .......... 310/40 MM |
| 6,355,998 B1 | * | 3/2002 | Schob et al. ................. 310/68 B |
| 2010/0043206 A1 | * | 2/2010 | Yamashita ...................... 29/598 |
| 2010/0090633 A1 | | 4/2010 | Deller |

FOREIGN PATENT DOCUMENTS

| | | |
|---|---|---|
| DE | 2915461 A1 | 10/1979 |
| DE | 3434965 A1 | 4/1985 |
| DE | 19916958 A1 | 10/2000 |
| DE | 10007868 A1 | 8/2001 |
| DE | 10122277 A1 | 11/2002 |
| DE | 10355076 A1 | 6/2005 |
| DE | 102004047784 A1 | 4/2006 |
| DE | 10 2007 000 440 A1 | 2/2008 |
| DE | 10 2010 003475 A1 | 1/2011 |

(Continued)

OTHER PUBLICATIONS

Machine Translation JP2001343206 (2001) and JP2000123940 (2000).*

*Primary Examiner* — Tran Nguyen
*Assistant Examiner* — Jose Gonzalez Quinones
(74) *Attorney, Agent, or Firm* — Brinks Gilson & Lione

(57) ABSTRACT

A miniature electric motor (1) with an outer diameter ($D_A$) that is smaller than or equal to 6 mm, has a hollow cylindrical stator (2) with stator coils (8) and a magnetic rotor (4) rotatably arranged around a rotational axis (16) in the stator (2) by means of a rotor shaft (10). The stator coils (8) can be energized in order to generate a magnetic rotational field in dependence upon the rotational position of the magnetic rotor (4). A sensor chip (20) having at least one magnetic field sensor (22) is arranged in such a manner in an area axially adjacent to a front face of the magnetic rotor (4) located within a plane that is vertical to the rotational axis (16) that the magnetic field sensor (22) is impinged in such a way by the magnetic field that the rotational position of the rotor can be evaluated.

17 Claims, 3 Drawing Sheets

(56) References Cited

FOREIGN PATENT DOCUMENTS

| EP | 0 510 336 | A2 | | 10/1992 |
|----|-----------|----|----|---------|
| EP | 0 920 113 | A1 | | 6/1999 |
| EP | 1182461 | A2 | | 2/2002 |
| EP | 1 456 935 | B1 | | 9/2004 |
| EP | 2117103 | A1 | | 11/2009 |
| JP | 2000123940 | A | * | 4/2000 |
| JP | 2012 75310 | A | | 10/2001 |
| JP | 2001343206 | A | * | 12/2001 |
| JP | 2001275310 | A | | 3/2003 |
| JP | 2003 319631 | A | | 11/2003 |
| JP | 2010 183797 | A | | 8/2010 |

\* cited by examiner

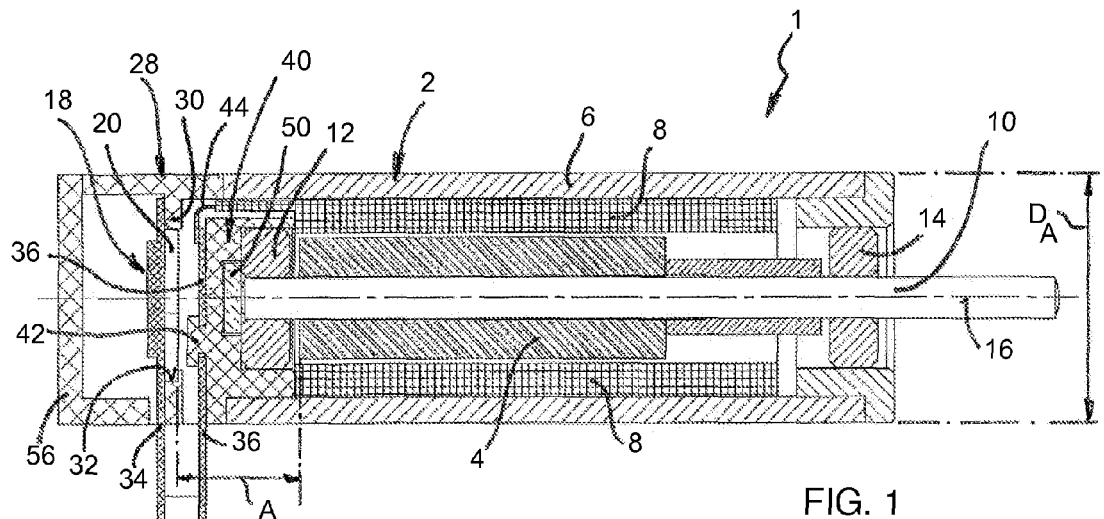
FIG. 1
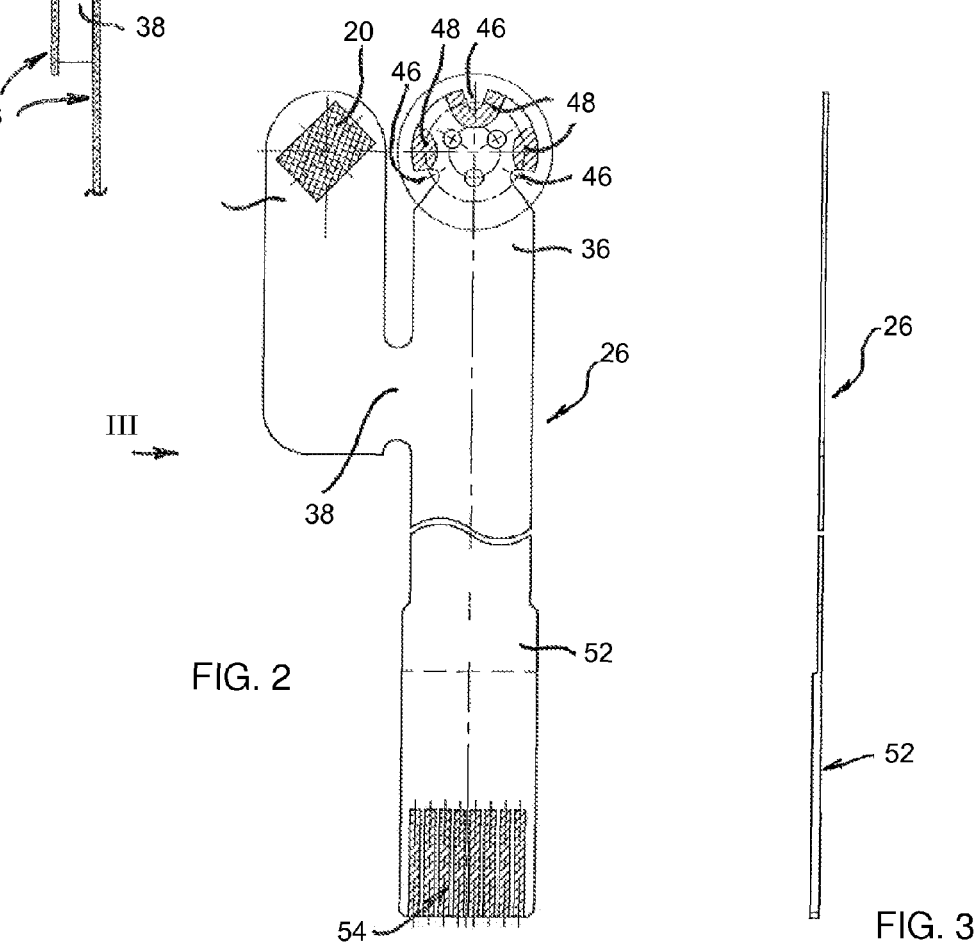
FIG. 2
FIG. 3

ELECTRIC MICROMOTOR

CROSS REFERENCE TO RELATED APPLICATION

This application claims priority to German Patent Application No. 20 2011 002 402.4, filed Feb. 4, 2011.

FIELD OF THE INVENTION

This invention concerns a miniature electric motor with an outer diameter smaller than/equal to 6 mm, consisting of a hollow cylindrical stator with stator coils and a magnetic rotor arranged so as to rotate around a rotational axis in the stator by means of a rotor shaft, wherein the stator coils can be driven in dependence upon the rotational position of the magnetic rotor in order to generate a magnetic rotating field.

BACKGROUND AND SUMMARY OF THE INVENTION

Miniature motors of the above-referenced type are frequently brushless direct current motors, which are also called BLDC motors (BLDC=brushless direct current). Because of their very small overall size with an outer diameter of only a maximum of 6 mm, the determination of the rotational rotor position, which is required for commutation control, takes place usually without sensors, generally on the basis of a determination and evaluation of the back EMF, that is, a voltage back-induced in the stator coils during rotation. It is thus difficult to realize an actuation at low speeds or even a rotational position regulation with such miniature motors.

On the other hand, in larger motors with a diameter of more than 6 mm, sensors can be used, in particular Hall-effect digital sensors, because the larger overall size allows accommodation of the sensors. The sensors can thus be arranged, for example, eccentrically around the periphery at specific peripheral angle intervals, wherein however an exact position alignment of the individual sensors is required.

EP 0 920 113 B1 describes a brushless direct current motor with a sensor arranged eccentrically radially beside the rotor, wherein the rotor has additionally a special permanently magnetized measuring magnetization zone. DE 10 2007 000 440 A1 also discloses a rotational angle detection device, which is positioned eccentrically radially beside the rotor.

According to EP 0 510 336 B1, the magnetic stray field of the motor magnet is utilized, but only the direction of rotation, not the angular position, is to be detected.

United States patent application 2001/0090633 A1 describes the use of a Hall-effect sensor, which however detects the magnetic field of an additional magnetized transmitting magnet with two poles, which rotates together with the rotor via the motor shaft.

Something similar applies also for a motor actuation according to EP 2 117 103 B1.

Finally, individual sensors for determining the magnetic field of the rotor are also utilized according to EP 1 456 935 B1.

All these known configurations are not suitable for a generic miniature motor of the kind discussed herein due to their extremely small overall size, with an outer diameter that must in any case be smaller than/equal to 6 mm.

The aim of the invention is the creation of a miniature motor of the generic kind described above, in which an improved actuation is achieved, in particular also for a rotational position regulation and/or for low speeds, while retaining its small compact design.

This aim is achieved according to the invention. Advantageous embodiments of the invention are disclosed in the dependent claims and in the following description.

It is accordingly provided according to the invention that a sensor chip in the form of at least one magnetic field sensor is arranged in such a way in an area which is axially adjacent to the front face of the magnetic rotor located within a plane that is vertical to the rotational axis is provided for the purpose of detecting the rotational position of the magnetic rotor. The magnetic field sensor is impinged by the magnetic field of the magnetic rotor in such a way that the magnetic field can be evaluated in order to determine the rotational position of the rotor. The magnetic field, that is, the stray field of the magnetic rotor, can thus be advantageously directly detected and evaluated by means of the invention without any additional transmitter elements, in order to detect the rotational position of the magnetic rotor. The sensor chip preferably includes several, and namely at least three, but preferably four individual magnetic field sensors, in particular Hall-effect sensors, integrated in one component. The positioning and alignment of the magnetic field sensors relative to the magnetic rotor is in this way also possible with great exactness within the very small motor; the standard sensor chip only needs to be mechanically positioned on the stator relative to the magnetic rotor.

The sensor chip can be configured with a very flat design, and in particular as a single chip encoder, which comprises a signal evaluation as IC component, which is such that it directly delivers, in addition to the magnetic field sensors, an absolute and/or incremental rotational position signal for an external electronic control system. In this way, the electronic control system can also be designed, in addition to the actual commutation, for the exact regulation of the rotor position and/or also for the adjustment of low rotor speeds. The actuation of the motor can thus be optimally commutated from a standstill across the entire speed range, which would not be possible by means of a synchronic control or with a sensorless control utilizing the back EMF induced voltage in the stator coils. The actuation of the motor can even take place with sinus commutation due to the available output signals of the preferred single chip encoder, which was not possible until now with this type of small motors.

It is furthermore advantageous if the magnetic field sensors integrated into the sensor chip are arranged in an area that covers the axial projection of the magnetic rotor and in a specific peripheral distribution over a reference circle around the extended rotational axis, wherein the reference circle has a diameter that is located in the area between the diameter of the rotor shaft, which corresponds to the inner diameter of the magnetic rotor, and the outer diameter of the magnetic rotor. It is particularly advantageous if the diameter of the reference circle on which the magnetic field sensors are arranged is located within the outer half of the annular cross section of the magnetic rotor. The sensor chip can furthermore be arranged very close to the magnetic rotor. The sensor chip should be spaced from the adjacent front face of the magnetic rotor via an axial gap, which corresponds to a maximum of 1 to 1.5 times the diameter of the reference circle of the magnetic field sensors. It has been shown that a secure detection of the rotational position of the rotor is possible based only on the magnetic field of the rotor by means of this described configuration and arrangement of the sensor chip, and thus without additional transmitter elements, such as in particular separate transmitter magnets.

BRIEF DESCRIPTION OF THE DRAWINGS

The invention and special embodiments will be described in more detail on the basis of the preferred exemplary embodiment shown in the drawings, wherein:

FIG. 1 shows a highly enlarged axial cross sectional representation of the miniature motor equipped with a sensor chip according to the invention;

FIG. 2 shows a plan view of a flexible conductor foil dedicated to the sensor chip;

FIG. 3 shows a lateral view of the conductor foil in the arrow direction III according to FIG. 2;

The same parts are always provided with the same reference signs in the different figures of the drawings.

DETAILED DESCRIPTION OF THE INVENTION

Figure 4:
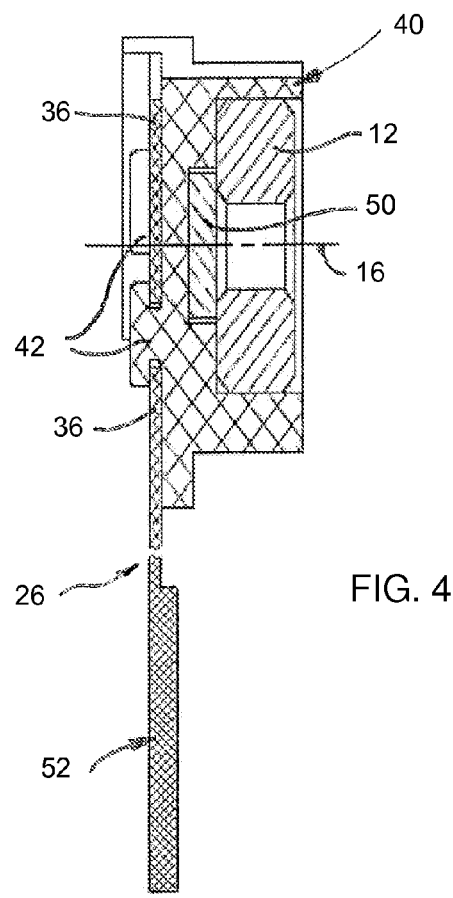
FIG. 4 shows a separate representation, additionally enlarged, of a bearing shield in axial section corresponding to FIG. 1.

With regard to the following description, it is expressly emphasized that the invention is not limited to the exemplary embodiment, and therefore not to all or several features of the described feature combinations, but that each individual partial feature of the exemplary embodiment has an inventive importance per se, separately from all others, with the partial features described in connection therewith.

As can be seen first of all in FIG. 1, a miniature electric motor 1 according to the invention is comprised of a hollow cylindrical stator 2 and a permanent magnetic rotor 4. The miniature motor 1 or its stator 2 has an outer diameter $D_A$, which is smaller than or equal to 6 mm, in particular even smaller than or equal to 5 mm. The stator 2 has an outer hollow cylindrical return path element 6 made from soft magnetic material, a so-called iron yoke, and stator coils 8 accommodated inside the return path element 6. The cylindrical magnetic rotor 4 is seated on a rotor shaft 10, which is in turn rotatably guided in pivot bearings 12 and 14, so that the magnetic rotor 4 is arranged inside the stator 2 via the rotor shaft 10 so as to rotate around the rotational axis 16.

The miniature motor 1 can be actuated by means of a preferably external electronic control system located outside of the motor, which is not depicted, wherein this electronic control system is designed for the brushless electronic commutation of the stator coils 8 for the purpose of generating a magnetic rotating field in dependence upon the rotational position of the magnetic rotor 4.

According to the invention, the miniature motor 1 for detecting the rotational position of the rotor has a standard sensor chip 20 with a very flat thin design as an IC (integrated circuit) component, which is concentrically arranged with respect to the rotational axis 16 in an area axially adjacent to a front face of the magnetic rotor 4 within a plane that is vertical to the rotational axis 16.

Figure 8:
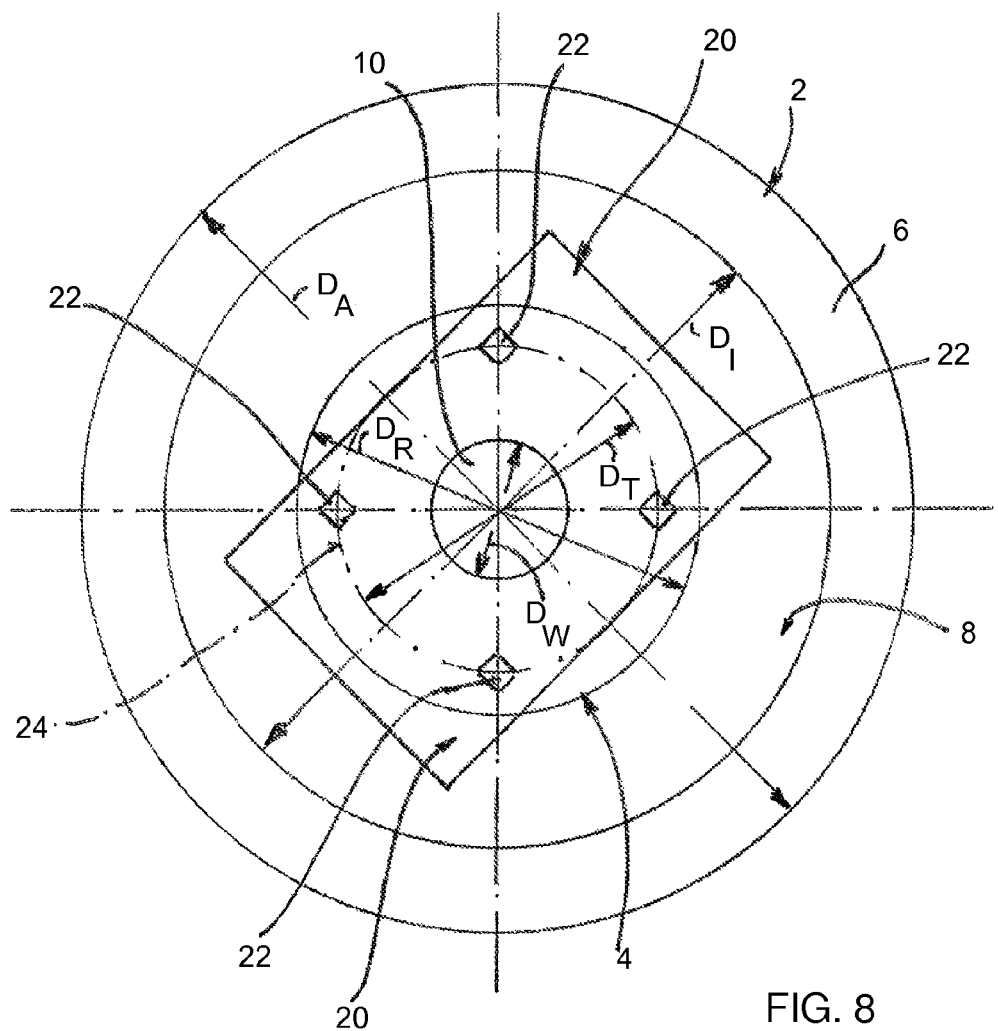
FIG. 8 shows a very highly enlarged basic axial view of the miniature motor according to the invention for the purpose of illustrating the arrangement and configuration of the sensor chip relative to the magnetic rotor.

As can be seen in particular in FIG. 8, the sensor chip 20 has preferably four integrated magnetic field sensors 22, which are designed especially as Hall-effect sensors. All of the magnetic field sensors 22 according to FIG. 8 are arranged in an area that covers the projection of the magnetic rotor 4 and in a specific, in particular radially symmetric peripheral distribution, over a reference circle 24 around the extended rotational axis 16, or the rotor shaft 10. The reference circle 24 has a diameter $D_T$, which is located in the area between the diameter $D_W$ of the rotor shaft 10, wherein this diameter $D_W$ corresponds to the inner diameter of the hollow cylindrical magnetic rotor 4, and the outer diameter $D_R$ of the magnetic rotor 4. In the preferred embodiment shown in FIG. 8, the reference circle 24 with its diameter $D_T$ is located within the outer half of the annular cross section of the magnetic rotor 4. Because of the preferably radially symmetric peripheral distribution of the preferably four magnetic field sensors 22, these are spaced from each other in peripheral direction at 90°, respectively. The sensor chip 20 is located inside the cross section enclosed by the return path element 6 as a result of its small design size.

With the described preferred embodiment and arrangement, the sensor chip 20 can directly detect and evaluate the magnetic field, that is, the straying effect of the magnetic rotor 4, with its magnetic field sensors 22, so that additional transmitter elements, in particular special transmitting magnets, can be advantageously omitted.

In this connection, it is additionally advantageous if the sensor chip 20 with the magnetic field sensors 22 is spaced from the adjacent front face of the magnetic rotor 4 via an axial gap A, which corresponds to a maximum of 1 to 1.5 times the diameter $D_T$ of the reference circle 24 of the magnetic field sensors 22; refer also to FIG. 1 in this regard.

In another preferred embodiment, the sensor chip 20 is configured as a single IC chip encoder, which has a signal evaluation integrated therein, in addition to the integrated magnetic field sensors 22, which is configured in such way that it detects the current rotational angle position of the magnetic rotor 4 and makes available for this purpose an absolute and/or incremental rotational position signal for the electronic control system. The integrated signal evaluation of the single chip encoder consists for this purpose of an electronic system, which is not separately depicted in the drawings.

Because of the very small design size of the miniature motor 1 according to the invention, it is in addition advantageous to configure the sensor chip 20 according to flip chip technology, which is known per se. This means that the integrated circuit is mounted in an inverted, turned arrangement on the upper side of a carrier, and without additional housing. The sensor chip 20 is suitably arranged herein on a flexible conductor foil 26, a so-called "flexboard" or "flex circuit", and electrically connected via circuit paths. A few components 18, particularly those that are passive, can be arranged, according to FIG. 1, on the side of the conductor foil 26 opposite to the sensor chip 20 for voltage stabilization.

Figures 5, 6, 7:
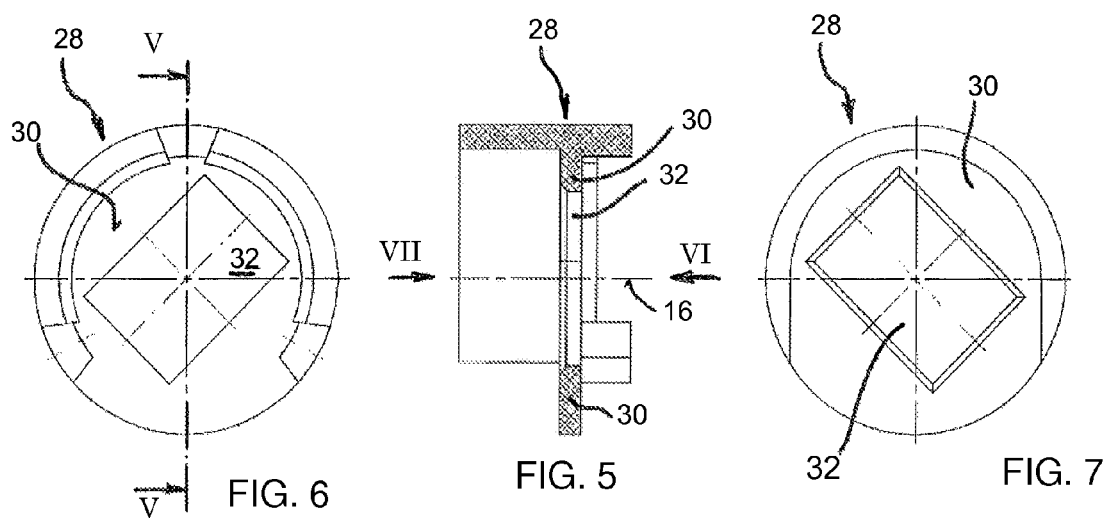
FIG. 5 shows a separate representation of a receiving part for receiving and positioning the sensor chip in an enlarged cross sectional view corresponding to FIG. 1.
FIG. 6 shows a view of the receiving part in arrow direction VI according to FIG. 5.
FIG. 7 shows a view of the receiving part at the opposite side in arrow direction VII according to FIG. 5.

The sensor chip 20 is to be exactly mechanically positioned relative to the stator 2 and the magnetic rotor 4, so that the integrated magnetic field sensors 22 are also directly optimally positioned by this positioning; refer to FIG. 8. The stator 2 is connected on one side to a flange-like receiving part 28 for the mechanical positioning of the sensor chip 20; reference is specifically made with regard to this to the separate depictions in FIGS. 5 through 7. The receiving part 28 connects axially flush directly or—as shown—indirectly, as shown in FIG. 1, to the return path element 6 of the stator 2. The receiving part 28 has a wall 30 that is vertical with respect to the rotational axis 16, which has a receiving opening 32, wherein the receiving opening 32 is adapted in such a way to the contour of the sensor chip with regard to its shape that the sensor chip 20 can be inserted in a form-fitting and therefore be positioned without play in the receiving opening 32. The sensor chip 20 and the corresponding receiving opening 32 have a contour that deviates from the circular shape, so that the sensor chip 20 can also be exactly aligned with reference to its rotational alignment. In the preferred embodiment shown herein, the sensor chip 20 and the receiving opening 32 have each a rectangular contour.

The flexible conductor foil 26 bearing the sensor chip 20 is depicted separately in FIGS. 2 and 3. The conductor foil 26 accordingly has a chip carrier section 34 connected to the sensor chip 20 and a stator section 36, which is electrically connected to the stator coils 8. In the assembled state pursuant to FIG. 1, the chip carrier section 34 and the stator section 36 are in two axially parallel and offset planes and are mutually connected via a connecting section 38 folded over by 180°. The stator section 36 is located closer to the stator 2 and the magnetic rotor 4 than the chip carrier section 34.

As can furthermore be seen in FIG. 1 and also in the enlarged view of FIG. 4, the stator section 36 of the conductor foil 26 is mounted on a bearing shield 40 of the stator 2. The bearing shield 40 receives the bearing 12, wherein the bearing shield 40 is seated in such a way between the stator 2 and the chip receiving-part 28, that the outer contour of the stator 2 or its return path element 6 passes flush with the receiving part 28 over the bearing shield 40. The mechanical connection between the bearing shield 40 and the stator section 36 of the conductor foil 26 takes place preferably via rivet-like holding elements 42 of the bearing shield 40, which are guided through hole openings of the stator section 36 of the conductor foil 26 and are fixed in place, in particular with heat. The stator coils 8 can be electrically connected via winding taps 44 (refer to FIG. 1) to the stator section 36 of the conductor foil 26 by means of the mechanical connection of the bearing shield 40 to the stator 2. For this purpose, the winding taps 44, that is, the wire ends of the stator coils 8, are guided through recesses 46 at the edges of the conductor foil 26 and soldered to contact zones 48 (refer to FIG. 2).

It should also be mentioned with reference to the representation in FIG. 4 that a thrust washer 50 for axially supporting the rotor shaft 10 is arranged within the bearing shield 40 between the latter and the pivot bearing 12; refer also to FIG. 1.

As can further be seen in FIGS. 1 through 3, the flexible conductor foil 26 has a terminal section 52 for external electric motor connection, that is, for electric connection to an external electronic control system. The terminal section 52 preferably forms an extension of the stator section 36 and is therefore located in the same plane. According to FIG. 2, the conductor foil 26 has an approximate Y shape in its flat, still unassembled state. The terminal section 52 has a thickening at the end, which has contact elements 54 for electric plug connection.

In the representation of FIG. 1 and the corresponding description, it can be seen that the magnetic field of the magnetic rotor 4 passes through several components until it reaches the area of the sensor chip 20 in the preferred embodiment. Surprisingly, the magnetic field can still be detected sufficiently accurately, to ensure an exact determination of the rotational position of the rotor. It is also advantageous in this connection if the magnetic rotor 4 within the stator 2 is arranged, according to FIG. 1, off-center in the direction of the sensor chip 20 with an offset relative to the stator coils 8. An increase of the effective signal strength is achieved in this way.

In the fully assembled state according to FIG. 1, the area of the receiving part 28 facing away from the stator 2 with the components 18, which are optionally arranged therein, is additionally covered by a protective cap 56. The flexible conductor foil 26 is located mainly outside the motor 1 and meshes with the motor only at the ends of the chip carrier section 34 and the stator section 36 through corresponding openings. The remaining sections, and thus also the connecting section 38 and the terminal section 52, are located outside the motor 1. The outer diameter $D_A$ in the represented and realized embodiment of the miniature motor 1 amounts to $D_A$=5 mm. The sensor chip has herein a surface dimension of 2 mm·2.8 mm. The outer diameter $D_R$ of the magnetic rotor 4 amounts to $D_R$=2.4 mm, while the diameter $D_T$ of the sensor reference circle 24 amounts to $D_T$=2 mm. The return path element 6 has an inner diameter $D_I$ of 4 mm. The distance A according to FIG. 1 between the sensor chip 20 and the magnetic stator 4 amounts to a nominal measurement of 2.47 mm. The invention is naturally not limited to these concrete measurements.

While the above description constitutes the preferred embodiment of the present invention, it will be appreciated that the invention is susceptible to modification, variation and change without departing from the proper scope and fair meaning of the accompanying claims.

The invention claimed is:

1. A miniature electric motor (1) with an outer diameter ($D_A$) that is smaller than or equal to 6 mm, comprising,
    a hollow cylindrical stator (2) with stator coils (8),
    a magnetic rotor (4) arranged so as to rotate around a rotational axis (16) in the stator (2) by means of a rotor shaft (10), wherein the stator coils (8) can be energized in order to generate a magnetic rotational field in dependence upon the rotational position of the magnetic rotor (4),
    a sensor chip (20) arranged concentrically with respect to the rotational axis (16), having at least four magnetic field sensors (22), and arranged in an area axially adjacent to a front face of the magnetic rotor (4) located within a plane that is vertical to the rotational axis (16) for the purpose of detecting the rotational position of the magnetic rotor (4), wherein the sensor chip (20) is spaced from an adjacent front face of the magnetic rotor (4) via an axial gap (A) in such a way that the magnetic field of the magnetic rotor (4) passes through several components until it reaches the area of the sensor chip (20) and that the magnetic field sensors (22) are impinged in such a way by the magnetic field of the magnetic rotor (4) that the magnetic field can be evaluated in order to determine the rotational position of the rotor.

2. The electric miniature motor of claim 1 wherein the magnetic field sensors are integrated magnetic field sensors (22), which are arranged in an area that covers an axial projection of the magnetic rotor (4) and in a specific peripheral distribution over a reference circle (24) around the rotational axis (16), wherein the reference circle (24) has a diameter ($D_T$), which is located in the area between the diameter ($D_W$) of the rotor shaft (10) and the outer diameter ($D_A$) of the magnetic rotor (4).

3. The electric miniature motor of claim 2 wherein the axial gap (A) corresponds to a maximum of 1 to 1.5 times the diameter ($D_T$) of the reference circle (24) of the magnetic field sensors (22).

4. The electric miniature motor of claim 1 wherein the sensor chip (20) has exactly four magnetic field sensors (22), which are evenly distributed over the reference circle (24) and are mutually offset by 90° respectively, with respect to each other.

5. The electric miniature motor of claim 1 wherein the sensor chip (20) is configured as a single chip encoder, which has a signal evaluation circuit, in addition to the magnetic field sensors (22), and delivers an absolute or incremental rotational position signal for an external electronic control system.

6. The electric miniature motor of claim 1 wherein the sensor chip (20), is electrically connected via a flexible conductor foil (26).

7. The electric miniature motor of claim 1 wherein the sensor chip (20) is mechanically exactly positioned relative to the stator (2) and the magnetic rotor (4).

8. The electric miniature motor of claim 7 wherein the stator (2) is connected on one side to a flange-like receiver part (28), wherein the receiving part (28) has a wall (30), which is vertical with respect to the rotational axis (16), and has a receiving opening (32) for play-free positioned accommodation of the sensor chip (20).

9. The electric miniature motor of claim 6 wherein the flexible conductor foil (26) has a chip carrier section (34) connected to the sensor chip (20) and a stator section (36) electrically connected to the stator coils (8), wherein the chip carrier section (34) and the stator section (36) are arranged in two parallel and offset planes and are mutually connected via a folded-over connecting section (38).

10. The electric miniature motor of claim 9 wherein the stator section (36) of the conductor foil (26) is mounted on a bearing shield (40) of the stator (2), wherein the winding taps (44) of the stator coils (8) are soldered.

11. The electric miniature motor of claim 6 wherein the flexible conductor foil (26) has a terminal section (52) for external electrical motor connection.

12. The electric miniature motor of claim 1 wherein the magnetic rotor (4) is arranged inside the stator (2) with an offset in the axial direction relative to the stator coils (8) and off-center in the direction toward the sensor chip (20).

13. A miniature electric motor (1) with an outer diameter (DA) that is smaller than/equal to 6 mm, comprising a hollow cylindrical stator (2) with stator coils (8), a magnetic rotor (4) arranged so as to rotate around a rotational axis (16) in the stator (2) by means of a rotor shaft (10), wherein the stator coils (8) can be energized in order to generate a magnetic rotational field in dependence upon the rotational position of the magnetic rotor (4), a sensor chip (20), having at least one magnetic field sensor (22), is arranged in an area axially adjacent to a front face of the magnetic rotor (4) located within a plane that is vertical to the rotational axis (16) for the purpose of detecting the rotational position of the magnetic rotor (4), the magnetic field sensor (22) is impinged in such a way by the magnetic field of the magnetic rotor (4) that the magnetic field can be evaluated in order to determine the rotational position of the rotor, wherein the sensor chip (20), which is preferably configured according to the flip chip technology, is electrically connected via a flexible conductor foil (26), wherein the flexible conductor foil (26) has a chip carrier section (34) connected to the sensor chip (20) and a stator section (36) electrically connected to the stator coils (8), wherein the chip carrier section (34) and the stator section (36) are arranged in two parallel and offset planes and are mutually connected via a folded-over connecting section (38).

14. The electric miniature motor of claim 13 wherein the sensor chip (20) having four magnetic field sensors (22), which are evenly distributed over the reference circle (24) and are mutually offset by 90° respectively, with respect to each other.

15. The electric miniature motor of claim 13 wherein the stator section (36) of the conductor foil (26) is mounted on a bearing shield (40) of the stator (2), wherein the winding taps (44) of the stator coils (8) are soldered.

16. The electric miniature motor of claim 13 wherein the flexible conductor foil (26) has a terminal section (52) for external electrical motor connection.

17. The electric miniature motor of claim 13 wherein the sensor chip (20) is configured as a single chip encoder, which has a signal evaluation circuit, in addition to the magnetic field sensors (22), and delivers an absolute or incremental rotational position signal for an external electronic control system.

* * * * *